United States Patent

Shaines

[15] 3,681,487

[45] Aug. 1, 1972

[54] METHOD OF PREPARING ARTICLES OF PRESSED WOOD

[72] Inventor: Alfred Shaines, Fanwood, N.J.

[73] Assignee: American Standard Inc., New York, N.Y.

[22] Filed: June 30, 1970

[21] Appl. No.: 51,351

Related U.S. Application Data

[63] Continuation-in-part of Ser. No. 735,167, June 7, 1968, abandoned.

[52] U.S. Cl. ................................................. 264/109
[51] Int. Cl. .............................................. B29j 5/00
[58] Field of Search ..................... 264/109, 123, 122

Primary Examiner—Robert F. White
Assistant Examiner—J. R. Hall
Attorney—Sheldon H. Parker, Tennes I. Erstad and Robert G. Crooks

[57] ABSTRACT

An improvement is provided in the ammonia process for making articles of pressed wood. The improvement comprises post heating the pressed wood article in a heating zone for a sufficient period of time at temperatures of at least 125° F. to impart an increase in the modulus of rupture and a decrease in water absorption to said pressed wood article.

6 Claims, No Drawings

METHOD OF PREPARING ARTICLES OF PRESSED WOOD

CROSS-REFERENCE TO RELATED APPLICATION

This application is a continuation-in-part of copending application Ser. No. 735,167 filed June 7, 1968, now abandoned.

BACKGROUND OF THE INVENTION

1. Field of the Invention

The present invention relates to an improved process for making articles of pressed wood; and more particularly, to improvements in the ammonia pressed wood process providing pressed wood articles exhibiting enhanced structural and physical properties.

2. Description of the Prior Art

The "ammonia" process heretofore employed to prepare articles of pressed wood is described and claimed in U.S. Pat. No. 3,305,499 to Rowland S. Bevans, patented Feb. 21, 1967. The detailed description of said process contained therein is incorporated herein by reference. Briefly, the process comprises impregnating wood flour or other cellulosic or ligno-cellulosic material with ammonia by soaking such material for about from 1 to 15 minutes in liquid ammonia at atmospheric pressure. Thereafter, the material is drained of excess liquid ammonia and compressed in a mold of selected shape at pressures ranging from about 300 to about 2,500 pounds per square inch at temperatures ranging up to about 200° C. The pressure is maintained until most of the ammonia has evaporated. It is considered advantageous to periodically provide momentary release of the pressure on the mold to permit escape of ammonia. Generally, sufficient ammonia escapes within from about 1 to 10 minutes, at which time the pressure within the mold can be reduced and the pressed wood article removed from the mold. Although the strength and integrity of the pressed wood articles prepared from the ammonia process have been reasonably good, they have not been considered commercially comparable to pressed wood articles obtained by the conventional pressed wood processes employing a resin binder. Moreover, the water absorption of pressed wood articles obtained by the ammonia process has been found to be quite high.

It is therefore an object of this invention to provide an improved ammonia pressed wood process which overcomes the above-noted deficiencies.

It is a still further object of the present invention to provide an improved ammonia pressed wood process capable of preparing pressed wood articles exhibiting properties which surpass those of the conventional pressed wood articles prepared with a resin binder.

SUMMARY OF THE INVENTION

These, as well as other objects, are accomplished by the present invention where, in a process for producing a pressed wood article from wood particles, said wood particles being selected from the class consisting of cellulosic and ligno-cellulosic materials, comprising soaking the wood particles in liquid ammonia until said wood particles are substantially completely impregnated with the liquid ammonia, removing excess ammonia from said impregnated wood particles, and molding said impregnated wood particles into a pressed wood article at a pressure of up to about 2,500 pounds per square inch, the improvement is provided comprising thereafter heating the pressed wood article for a finite period of time commensurate with a temperature of at least about 125° F. and sufficient to impart an increase in the modulus of rupture and a decrease in the water absorption of said pressed wood article.

DESCRIPTION OF THE INVENTION

As used herein, the word "wood" is intended to encompass any cellulosic or ligno-cellulosic material. The cellulosic materials include, for example, flour, starch and the like; the ligno-cellulosic materials include, for example, natural constituents of trees, plants and the like.

Although not wishing to be bound by any theory or mechanism regarding the role of ammonia in this process, it is currently believed that the ammonia may plasticize the wood particles by rupturing hydrogen bonds between cellulose chains, thereby allowing them to fit very closely together. Upon evaporation of the ammonia, the hydrogen bonds re-form and the wood once again becomes "hard." The ammonia may also react directly with the wood and other constituents thereof to form additional bonding therebetween, giving rise to a rigid structural material.

The processes of the present invention do not require the use of a resin to bind the wood particles as is required by other processes heretofore employed in the preparation of pressed wood articles. This is of distinct advantage since ammonia is not only considerably less expensive than the resins which have been employed, but may also be readily recovered.

In accordance with the present invention, the wood particles are impregnated with liquid ammonia by soaking for from about 1 to 15 minutes. The desired quantity of liquid ammonia-impregnated wood particles is then compressed in a mold of selected shape at pressures ranging from about 300 to about 2500 pounds per square inch. Where large size articles are desired, a preferred pressure range from about 300 to about 500 pounds per square inch has been found to produce articles having smooth surfaces and useful strength. During the molding operation elevated temperature can be maintained, if desired, up to about 200° C. The pressure is maintained until most of the ammonia has evaporated. It is advantageous to momentarily release the pressure of the mold one or more times to permit escape of the ammonia. Sufficient ammonia escapes within from about 1 to 10 minutes, after which time the pressure is reduced and the object is removed from the mold. However, longer exposures to the higher pressures and temperatures are not considered detrimental to the process.

In forming the molded objects, it is preferred to use finely divided particles of wood, such as, for example, wood flour. Particles of somewhat larger size, such as sawdust, can also be used in the process of the invention as such process imparts greater plasticity to said larger particles during molding. In conventional pressed wood processes heretofore employed, these larger particles did not fit together well, resulting in products of low density and rough surfaces.

While treatment with a resin is not necessary in preparing the pressed wood articles according to the processes of this invention, it has been found to be advantageous in some cases to add a resin such as a melamine resin, urea resin, phenolic resin and the like, to the wood particles, preferably before the treatment with liquid ammonia. The resin serves to aid in the bonding of the particles which are treated with liquid ammonia.

After the article is molded as described above, it is placed in a heating zone, such as an oven, preferably having a forced air draft, and heated in said heating zone for a finite period of time commensurate with a temperature of at least about 125° F. and sufficient to impart an increase in modulus of rupture as measured by ASTM Method D–1037–64, and a decrease in water absorption as measured by ASTM Method D–805–63, to said pressed wood article. Generally, it has been found that temperatures ranging from about 125° F. to below about the decomposition temperature of the pressed wood article under the conditions of heating are sufficient to impart the enhanced structural and physical properties obtained through the present invention to the pressed wood articles. It is apparent, of course, that the decomposition temperature of the pressed wood article can be varied according to the heating method employed. For example, if heating is conducted in the absence of oxygen, the decomposition temperature can be significantly raised. Preferably, however, heating is conducted at temperatures ranging from about 125° F. to about 500° F.; and most preferably, heating is conducted at temperatures ranging from 250° to 350° F. At lower temperatures, the heating is generally continued for up to about 48 hours, whereas when the heating is conducted at the higher temperatures a commensurately shorter heating period down to about 6 hours can be employed. Most preferably, the pressed wood article is heated at temperatures of about 350° F. for about 48 hours.

The particular heating system is not considered critical and can be forced air heating, radiant heating, dielectric heating or any other similar heating system capable of substantially maintaining a given temperature over a given period of time. The post-heating treatment in accordance with the present invention has been found to significantly enhance the structural and physical properties of pressed wood articles. For example, pressed wood articles have been obtained in this invention exhibiting twice the modulus of rupture heretofore obtainable and the water absorption of such articles has been reduced by a factor of 3 to 5. Lower temperatures and/or shorter exposure times, of course, produce a concomitant lesser improvement in these properties.

Other additives can be incorporated into the wood composition to impart additional desirable properties to the pressed wood articles. For example, ammonia pressed wood articles made in accordance with the process of the present invention, can be improved by the addition of Masonite fibers. These fibers are prepared by heating wood chips in an autoclave at high pressure and releasing the pressure very quickly. They are generally stirred in water, formed into a mat and compressed at elevated temperatures into hardboard. A 50—50 mixture (by weight) of these fibers and wood flour, soaked in ammonia, molded and post-treated at 350° F. for 48 hours exhibited a 22% higher modulus of rupture and a 39 percent lower water absorption than ammonia pressed wood made of wood flour alone, but also post-treated at 350° F. for 48 hours. The addition of these fibers to wood flour in the ammonia pressed wood process has the effect of improving the properties of ammonia pressed wood prepared from wood flour or, conversely, wood flour can be added to such fibers in the ammonia pressed wood process as a means of reducing costs. While Masonite fibers are preferred, other cellulosic fibers can also be used, such as bagasse, cotton and the like. The mixture of wood particles and cellulosic fiber can vary in composition and can contain from about 1% to about 99 percent by weight of cellulosic fibers.

In the manufacture of hardboard such as from Masonite fibers, the molded board is often immersed, sprayed or otherwise coated with a tempering oil generally comprising a mixture of a polymeric petroleum oil, linseed oil and a hardener, maintained at 230° to 280° F. and then subjected to postheating at 275° to 360° F. for about 3 to 6 hours to cure the oil. It has been found that the same treatment can be applied to ammonia pressed wood, resulting in a marked improvement in modulus of rupture and water absorption. It has also been found in the present invention that if from about 1 part to about 10 parts of tempering oil are added to each 100 parts of wood flour before the wood flour is soaked in liquid ammonia and the wood flour is subsequently molded and post-heated at a temperature of at least 250° F., unusual results are obtained. The preferred use of 350° F. for about 48 hours, results in a modulus of rupture about 115 percent higher than "untempered" ammonia pressed wood and a water absorption about 33 percent lower. Similar improvements are obtained with wood flour-Masonite fiber mixtures.

Zinc stearate is often blended with melamine, urea or phenolic resins and wood flour in order to improve the water absorption of resin bonded wood flour articles. It has been found in the present invention that if zinc stearate is added to the wood flour to the extent of from about 0.5 to about 1.0 part per 100 parts wood flour and the mixture is then soaked in liquid ammonia and molded, the water absorption will be reduced by about 38 percent. If the molded article is then heat-treated in accordance with the present invention, at about 350° F. for about 48 hours, the water absorption is further reduced about an additional 27 percent.

In addition to the foregoing additives, I have found that if tempering oil and zinc stearate are added to wood flour and the resulting composition is subsequently soaked in liquid ammonia, molded and post-heated at about 350° F. for about 48 hours, the resulting product exhibits a modulus of elasticity about 410 percent higher and a water absorption about 26 percent lower than that of a zinc stearate tempering oil-modified non-post heat-treated ammonia pressed wood.

The following examples further define, describe and compare methods of preparing pressed wood articles in accordance with the present invention. Parts and percentages are by weight unless otherwise indicated.

EXAMPLE 1

Two samples of ammonia pressed wood were prepared. In each, 90 grams of wood flour were soaked in liquid ammonia and filtered in a laboratory 126 mm. diameter Buchner funnel to remove excess ammonia. The wet cake was placed in a 5⅝ inches diameter disc mold preheated to 325° F. and compressed for 10 minutes with an applied force of 10,000 pounds. One of the two resulting discs was placed in an air circulating oven for 48 hours at 300° F. The two discs were then conditioned at 70° F. and 65 percent relative humidity for 24 hours to enable testing to be conducted upon samples under common conditions of temperature and moisture conditions and then tested for modulus of rupture (ASTM Method D-1037-64), with the following results:

|  | Modulus of Rupture (psi) |
|---|---|
| Post treated disc | 1672 |
| Non-post treated disc | 1111 |

EXAMPLE 2

Four samples of ammonia pressed wood were prepared according to the procedure described in Example 1 but with different percentages of Masonite fibers mixed in with the wood flour. The resulting discs were cut in half and one such half section of each was post-treated in an air circulating oven for 48 hours at 350° F. They were then all conditioned at 70° F. and 65 percent relative humidity and their modulus of rupture and water absorption (ASTM Method D-805-63) measured, with the following results:

| % Masonite Fibers | Modulus of Rupture (psi) | | Water Absorption % | |
|---|---|---|---|---|
|  | Post-Treated | Nonpost-Treated | Post-Treated | Nonpost-Treated |
| 0 | 4721 | 2193 | 12.6 | 18.9 |
| 10 | 4800 | 2110 | 9.3 | 16.6 |
| 50 | 5763 | 2808 | 7.6 | 11.5 |
| 100 | 5794 | 4369 | 5.2 | 7.8 |

EXAMPLE 3

0.72 gram of zinc stearate was added to wood flour.

The mixture was treated as described in Example 1 to obtain 5⅝ inches molded discs. Each disc was cut in two, and one half was placed in an air circulating oven for 48 hours at 350° F. The pressed wood discs were conditioned at 70° F. and 65 percent relative humidity for 24 hours and tested for modulus of rupture and water absorption with the following results:

|  | Modulus of Rupture (psi) | Water Absorption (%) |
|---|---|---|
| No Heat Treatment | 2192 | 37.5 |
| Heat Treatment | 2800 | 27.5 |

EXAMPLE 4

0.72 gram of zinc stearate and 6 parts of a tempering oil comprising 100 parts of a polymeric petroleum oil (Panapol FM 7659 manufactured by Amoco Chemical Corporation, Chicago, Illinois), 100 parts raw linseed oil, and 3.4 parts iron naphthenate (6 percent solution in mineral spirits), were added to 90 grams of wood flour.

The mixture was treated as described in Example 1 to obtain 5⅝ inches molded discs. Each disc was cut in two, and one half placed in an air circulating oven for 48 hours at 350° F. The pressed wood discs were then conditioned at 70° F. and 65 percent humidity for 24 hours and tested for modulus of rupture and water absorption with the following results:

|  | Modulus of Rupture (psi) | Water Absorption (%) |
|---|---|---|
| No Heat Treatment | 1494 | 46.7 |
| Heat Treatment | 6647 | 12.0 |

Although specific materials and conditions were set forth in the above exemplary processes in making the improved pressed wood articles of the present invention, these are merely intended as illustrations of the present invention. Various other molded articles, temperatures, pressures and post-heating periods, as well as additives, can be employed with similar results.

Other modifications of the present invention will occur to those skilled in the art upon a reading of the present disclosure. These are intended to be included within the scope of this invention.

What is claimed is:

1. In a process for producing a pressed wood article from wood particles and/or fibers, the wood particles and/or fibers being selected from the class consisting of cellulosic and ligno-cellulosic materials, said process comprising the steps of soaking the wood particles and/or fibers in liquid ammonia until said particles are substantially completely impregnated with the liquid ammonia, and pressure molding the impregnated wood particles and/or fibers into a desired article: the improvement comprising thereafter heating the pressed wood article in a temperature range between 125° and 500° F. for a period ranging from 48 hours to 6 hours.

2. Process as defined in claim 1 wherein the heating step is carried out at temperatures ranging from about 250° F. to about 350° F.

3. Process as defined in claim 1 wherein the heating step is carried out at a temperature of about 350° F. for a time period of about 48 hours.

4. Process as defined in claim 1 wherein a minor percentage of polymerizable tempering oil is admixed with the wood particles and/or fibers prior to the ammonia soaking step.

5. A process for producing a pressed article from particulate matter selected from the class consisting of cellulosic and ligno-cellulosic materials, comprising the steps of soaking the particulate matter in liquid ammonia until it is substantially completely impregnated with the liquid ammonia, pressure molding the impregnated particulate matter into a pressed article, and thereafter heating the pressed article for a period ranging from about 6 hours to about 48 hours; said heating step being carried out in a temperature range between 125° F. and just below the decomposition temperature of the pressed article.

6. The process of claim 5 wherein the heating step is carried out at temperature of about 350° F. for a time period of about 48 hours.

* * * * *